United States Patent Office 3,679,374
Patented July 25, 1972

3,679,374
SEPARATION OF PHOSPHORUS ACID FROM MIXTURES OF PHOSPHORUS ACID AND PHOSPHORIC ACID BY CRYSTALLIZATION
William L. Kovacs, Springfield Township, Hamilton County, Ohio, assignor to The Procter & Gamble Company, Cincinnati, Ohio
No Drawing. Filed Mar. 31, 1970, Ser. No. 24,400
Int. Cl. C01b 25/00, 25/12
U.S. Cl. 23—297                                9 Claims

ABSTRACT OF THE DISCLOSURE

A method of isolating phosphorous acid from a mixture of phosphorous and phosphoric acid comprising the formation of a solution of said acid mixture in an alkyl phosphate or phosphite solvent at a temperature above about 70° F., cooling the acid/solvent solution to a temperature below about 70° F. and recovering the resultant phosphorous acid crystals by conventional means.

BACKGROUND OF THE INVENTION

This invention relates to the isolation of orthophosphorous acid ($H_3PO_3$) from mixtures of orthophosphorous acid and orthophosphoric acid ($H_3PO_4$). For purposes of simplicity, these two acids will be referred to hereinafter as phosphorous and phosphoric acid respectively or by their chemical formulas. Phosphorous acid is useful as a reducing agent in reactions where a strong but relatively slow acting reducing agent is desirable. It is also useful as a starting material for the production of phosphitic esters such as diethyl phosphite, which is useful as a lubricant additive, antioxidant and solvent.

Heretofore the utilization of phosphorous acid has been somewhat limited by the relatively high cost of this acid. Copending U.S. patent applications, Ser. No. 566,482, filed July 20, 1966 by David D. Whyte et al. and Ser. No. 678,280, filed Oct. 26, 1967 by David D. Whyte et al. describe economically advantageous methods for producing phosphorous acid from elemental phosphorus. According to these methods, however, some phosphoric acid is formed concurrently with the phosphorous acid. In order to realize the full economic potential of these methods, a convenient means of separating phosphorous acid from phosphoric acid is desirable.

Netherlands patent application 6614133, published Apr. 10, 1967, discloses a fractional crystallization technique for separating phosphorous acid from phosphoric acid using water as the solvent. In the practice of the present invention, substantially superior results are achieved by a technique utilizing certain phosphate and phosphite esters as solvents.

DESCRIPTION OF THE INVENTION

The object of the present invention is to provide an improved process for the separation of phosphorous acid from mixtures of phosphorous and phosphoric acid.

A further object is to provide a process which achieves a high recovery of phosphorous acid in crystalline form while maintaining a high standard of crystal purity. These and further objects will be apparent from the following description.

According to the present invention, phosphorous acid is separated from a mixture of phosphorous and phosphoric acids in the following manner. A solvent selected from the group consisting of lower alkyl phosphate and phosphite esters is mixed with a mixture of phosphorous and phosphoric acids forming a solution containing more than 50 wt. percent of acid, and from 1 wt. percent to 50 wt. percent solvent, said solution containing less than about 10% water. (Hereinafter all percentages are by weight, unless specified otherwise.) The solution of acids in the solvent is formed at a temperature above 70° F. preferably at a temperature in the range of about 70° F. to about 90° F. (In the context of this invention, the forming of a solution of the acid mixture in the solvent at a temperature above 70° F. also encompasses mixing the acids and solvent at a temperature below 70° F. and heating the mixture to a temperature above 70° F.) The solution is then cooled to a temperature lower than 70° F., preferably from about −20° F. to about 65° F., and more preferably from about 20° F. to about 60° F. At temperatures above 70° F. there is little or no crystallization, and at temperatures below about −20° F. the separation of $H_3PO_3$ from $H_3PO_4$ is not good. The crystals of phosphorous acid which precipitate from the cooled mixture are collected in a conventional manner such as filtration. The formation of crystals in the cooled mixture can be facilitated by "seeding" with a few crystals of pure phosphorous acid. The collected crystals can be washed with a liquid which dissolves the solvent but not the phosphorous acid, e.g. diethyl ether or petroleum ether. After filtration of the phosphorous acid crystals, recovery of the solvent can be accomplished by washing the mother liquor with water. One washing, with 5 parts water to 1 part mother liquor, has been found to give 95% removal of the remaining phosphorous and phosphoric acid.

If a very high purity phosphorous acid is desired, the filtered crystals can be dissolved in water. Any solvent or washing liquid remaining trapped in the crystals will then separate into a separate phase which can be decanted off, leaving behind an aqueous solution of very high purity phosphorous acid.

The mixtures of phosphorous and phosphoric acids to be separated by the process of the present invention can be derived for example from the oxidation of phosphorus in the presence of CO and $CO_2$ followed by hydrolysis, as described in U.S application Ser. No. 566,482, filed July 20, 1966 or from the liquid phase oxidation of phosphorus followed by hydrolysis as described in U.S. application Ser. No. 678,280, filed Oct. 26, 1967. These mixtures will normally contain water and if the mixture of phosphorous and phosphoric acids is in an aqueous solution which contains an amount of water which is too high such that the acid/solvent mixture prepared in the practice of this invention contains more than about 10% water, the excess water should be removed from the acid mixture, for example by distillation prior to adding the solvent. The ratio of $H_3PO_3/H_3PO_4$ in the mixture of acids to be separated should be about 0.8 or greater and preferably should be about 1.5 or greater. Impurities, other than excess water, which may normally be present in mixtures of phosphorous and phosphoric acid are not detrimental to the practice of the instant invention.

The solvent for use herein is selected from the group consisting of di- and tri-alkyl phosphate esters and di-alkyl phosphite esters having, respectively, the following general formulas:

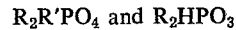

$R_2R'PO_4$ and $R_2HPO_3$ wherein each R is a straight or branched chain alkyl group having 1 to 10 carbon atoms, and R' is hydrogen or a straight or branched chain alkyl group having 1 to 10 carbon atoms. The mono-esters do not perform effectively as solvents herein, and the di- and tri-esters having alkyl groups containing more than 10 carbon atoms have melting points which are too high to be useful herein. Specific examples of suitable solvents include, but are not limited to, trimethyl phosphate, tri-isopropyl phosphate, tributyl phosphate, trihexyl phosphate, trinonyl phosphate, di-isopropyl phosphate, dibutyl phosphate, dinonyl phosphate, dimethyl phosphite, di-isopropyl phosphite, dihexyl phosphite and dioctyl phosphite. Preferred solvents are tri-isopropyl phosphate, tributyl phosphate, di-isopropyl phosphate, di-isopropyl phosphite and dimethyl phosphite. A particularly preferred solvent is tributyl phosphate.

The solvent is used at a level of about 1% to about 50% of the total mixture of phosphorous acid, phosphoric acid, solvent, and water or other miscellaneous materials which may be present. Preferably, the solvent is present at about 15% to about 35% of the total mixture.

In order to obtain the desired degree of separation and an effective yield of phosphorous acid from the process herein, it is important to keep the water level in the acid/solvent mixture below about 10%. This is inclusive of water picked up from the atmosphere. Preferably, the water level should be kept at 6% or lower.

Although it is not desired to be bound by theory, it is believed that high acid/solvent ratios as set forth above give better separation because they lead to keener competition by the solvent for the OH bonding sites on the $H_3PO_3$ and $H_3PO_4$ acids. $H_3PO_4$, with 3OH bonding sites, has one more than does $H_3PO_3$, and thus tends to stay in the solvent. This further explains why water, which provides many OH bonding sites per unit weight, must be kept at low levels in order to effect good separations.

In a preferred manner of performing the invention herein, a mixture comprising 60% to 80% phosphorous and phosphoric acid, 6% or less water and the remainder an alkyl phosphate or phosphite ester solvent as hereinbefore defined is formed at a temperature of about 85° F. The mixture is then cooled to about 40° F. and seeded with a few crystals of pure phosphorous acid, thereby causing the rapid precipitation of phosphorous acid crystals. The crystals are filtered off by vacuum filtration and washed with diethyl ether solvent. By using this technique recoveries of about 70% of the phosphorous acid present in the initial phosphorous/phosphoric acid mixture have been obtained, with crystal purities of greater than 90 mol percent phosphorous acid. Crystal purity is defined by the expression (mols $H_3PO_3$/mols $H_3PO_3$+mols $H_3PO_4$)×100.

The invention is further illustrated by the following examples.

EXAMPLE I 20 grams of $H_3PO_3$ crystals, 10.2 grams phosphoric acid (approx. 85% $H_3PO_4$ in water) and 14.45 grams tributyl phosphate were mixed in a beaker and heated to approximately 145° F. to quickly dissolve all of the $H_3PO_3$ crystals. The resulting solution, when cooled to about 75° F. contained approximately 3.8% water, 65% acid (70:30 $H_3PO_3$:$H_3PO_4$) and 31.2% tributyl phosphate. The solution was then cooled to 60° F. The crystals which formed upon cooling and seeding with a few crystals of $H_3PO_3$ were collected by vacuum filtration, washed with diethyl ether, dried and weighed. The weight of the recovered crystals was 15.71 grams, which contained 3.4% water. The crystal purity, determined by nuclear magnetic resonance (NMR) and defined as (mols $H_3PO_3$/mols $H_3PO_3$+mols $H_3PO_4$)×100, was found to be 92.2 mol percent, and the overall yield of $H_3PO_3$ based on the weight of $H_3PO_3$ in the initial acid/solvent mixture was calculated to be 69%.

EXAMPLE II

When trimethyl phosphate was substituted for tributyl phosphate in the experiment of Example I, and the solution was cooled to 40° F. instead of 60° F., 8.81 grams of crystals were recovered, containing 3.9% water and having a crystal purity of 95.3 mol percent as determined by NMR. The overall yield of $H_3PO_3$, based on the initial weight of $H_3PO_3$ in the acid/solvent mixture was calculated to be 40%. Similar results to those obtained with trimethyl phosphate are obtained when the solvent is tri-isopropyl phosphate, trihexyl phosphate, trinonyl phosphate, di-isopropyl phosphate, dibutyl phosphate and dinonyl phosphate.

EXAMPLE III

When di-isopropyl phosphite was substituted for tributyl phosphate in the experiment of Example I, and the solution was cooled to 40° F. instead of 60° F., 13.2 grams of crystals were recovered containing 1.66% water and having a crystal purity of 95.8 mol percent, as determined by NMR. The overall yield of $H_3PO_3$, based on the initial weight of $H_3PO_3$ in the acid/solvent mixture was calculated to be 61.9%. Similar results to those obtained with di-isopropyl phosphite are obtained when the solvent is dimethyl phosphite, dihexyl phosphite and dioctyl phosphite.

In the foregoing examples it was necessary to heat the mixture of acid and solvent to a relatively high temperature in order to quickly dissolve all of the $H_3PO_3$ crystals. In the commercial practice of the invention, however, this is normally not necessary. As will be illustrated in the following examples, aqueous solution of phosphorous and phosphoric acids from sources such as the processes described in U.S. application Ser. No. 566,482, filed July 20, 1966 and U.S. application Ser. No. 678,280, filed Oct. 27, 1967 is simply concentrated, e.g., by distillation, to a water level which will yield an acid/solvent/water ratio within the limits prescribed by the invention when mixed with the appropriate amount of solvent. When this concentrated aqueous solution is mixed with the solvent it will form a homogeneous solution at temperatures in the range of about 70° F. to about 90° F.

EXAMPLE IV 100 kg. of an aqueous mixture containing 80%

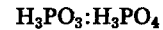
$$H_3PO_3:H_3PO_4$$

in a 74:26 weight ratio and 20% water, is obtained from the process described in U.S. application Ser. No. 678,280, filed Oct. 27, 1967. The mixture is concentrated by evaporation to a water content of 8% and mixed at a temperature of about 90° F. with 31.5 kg. tributyl phosphate solvent, thus forming a solution containing 67.5% acid, 26.6% solvent and 5.9% water. The solution is then cooled to 40° F. The crystals which form upon cooling and seeding with a few crystals of $H_3PO_3$ are collected by vacuum filtration washed with diethyl ether and dried. The crystal purity, as determined by NMR, is greater than 90 mol percent $H_3PO_3$ and the overall yield of $H_3PO_3$ based on the weight of $H_3PO_3$ in the initial acid/solvent mixture is about 70%.

EXAMPLE V 100 kg. of an aqueous mixture containing 70%

$$H_3PO_3:H_3PO_4$$

in a 90:10 weight ratio and 30% water, is obtained from the process described in U.S. application Ser. No. 566,482, filed July 20, 1966. The mixture is concentrated by evaporation to a water content of 5% and mixed at a temperature of about 85° F. with 32 kg. of di-isopropyl phosphite solvent, thus forming a solution containing 65.4% acid, 31.1% solvent and 3.5% water. The solution is then cooled to 40° F. The crystals which form upon cooling and seeding with a few crystals of $H_3PO_3$ are collected by vacuum filtration, washed with diethyl ether and dried. The crystal purity, as determined by NMR is greater than 95 mol percent $H_3PO_3$ and the overall yield of $H_3PO_3$ based on the weight of $H_3PO_3$ in the initial acid/solvent mixture is about 60%.

What is claimed is:

1. A process for the separation of phosphorous acid from a mixture of phosphorous and phosphoric acids comprising the steps of
   (a) forming a solution of said mixture at a temperature above 70° F. in a solvent selected from the group consisting of di- and tri-alkyl phosphates of the general formula $R_2R'PO_4$ and di-alkyl phosphites of the general formula $R_2HPO_3$, wherein each R is a straight or branched alkyl chain having 1 to 10 carbon atoms and R' is hydrogen or a straight or branched alkyl chain having 1 to 10 carbon atoms, or mixtures thereof, said solution comprising more than 50 wt. percent acid, 1 wt. percent to 50 wt. percent solvent, and said solution containing less than 10% water.

(b) cooling said solution to a temperature below 70° F. whereby phosphorous acid crystallizes out of solution, and (c) collecting said phosphorous acid crystals.

2. The process of claim 1 wherein the solvent is selected from the group consisting of tributyl phosphate, trimethyl phosphate and di-isopropyl phosphite.

3. The process of claim 2 wherein the solvent is tributyl phosphate.

4. The process of claim 2 wheerin the solution of Step (a) is formed at a temperature between 70° F. and 90° F.

5. The process of claim 4 wherein the solution of Step (a) contains less than 6% water.

6. The process of claim 5 wherein the solution of Step (a) contains from about 60% to about 80% acid.

7. The process of claim 2 wherein in Step (b) the temperature is from about —20° F. to about 65° F.

8. The process of claim 7 wherein in Step (b) the temperature is from about 20° F. to about 55° F.

9. The process of claim 2 wherein in Step (c) the crystals are collected by vacuum filtration.

References Cited

UNITED STATES PATENTS

| | | | |
|---|---|---|---|
| 3,410,656 | 11/1968 | Bunin | 23—312 P |
| 3,532,461 | 10/1970 | Whyte | 23—165 |
| 3,458,281 | 7/1969 | Demarcq | 23—165 |
| 3,528,772 | 9/1970 | Whyte | 23—165 |

FOREIGN PATENTS

| | | | |
|---|---|---|---|
| 227,310 | 6/1969 | U.S.S.R. | 23—165 |
| 6614133 | 4/1967 | Netherlands. | |

NORMAN YUDKOFF, Primary Examiner

S. SILVERBERG, Assistant Examiner

U.S. Cl. X.R.

23—165 C, 312 P